United States Patent Office 3,556,649
Patented Jan. 19, 1971

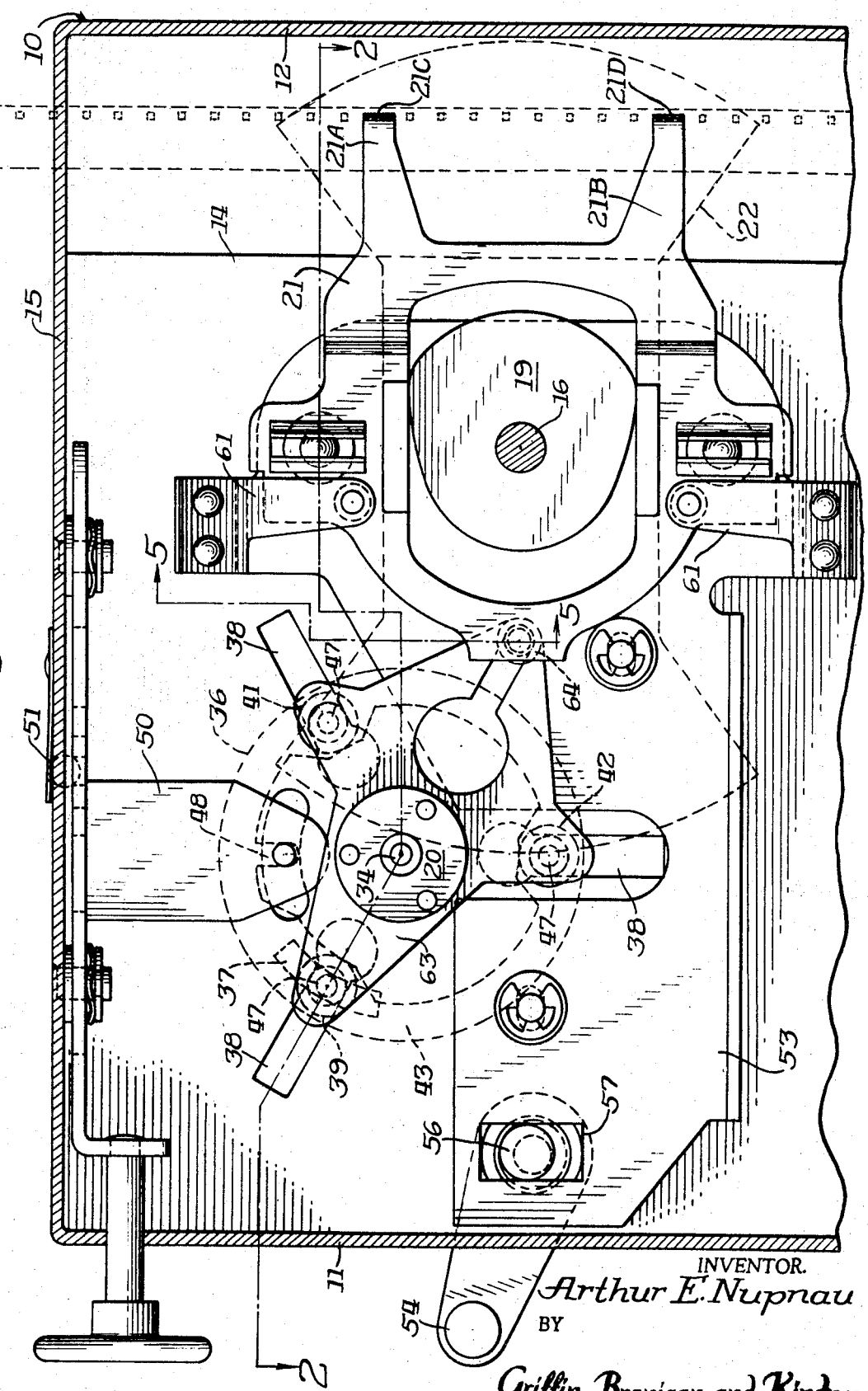

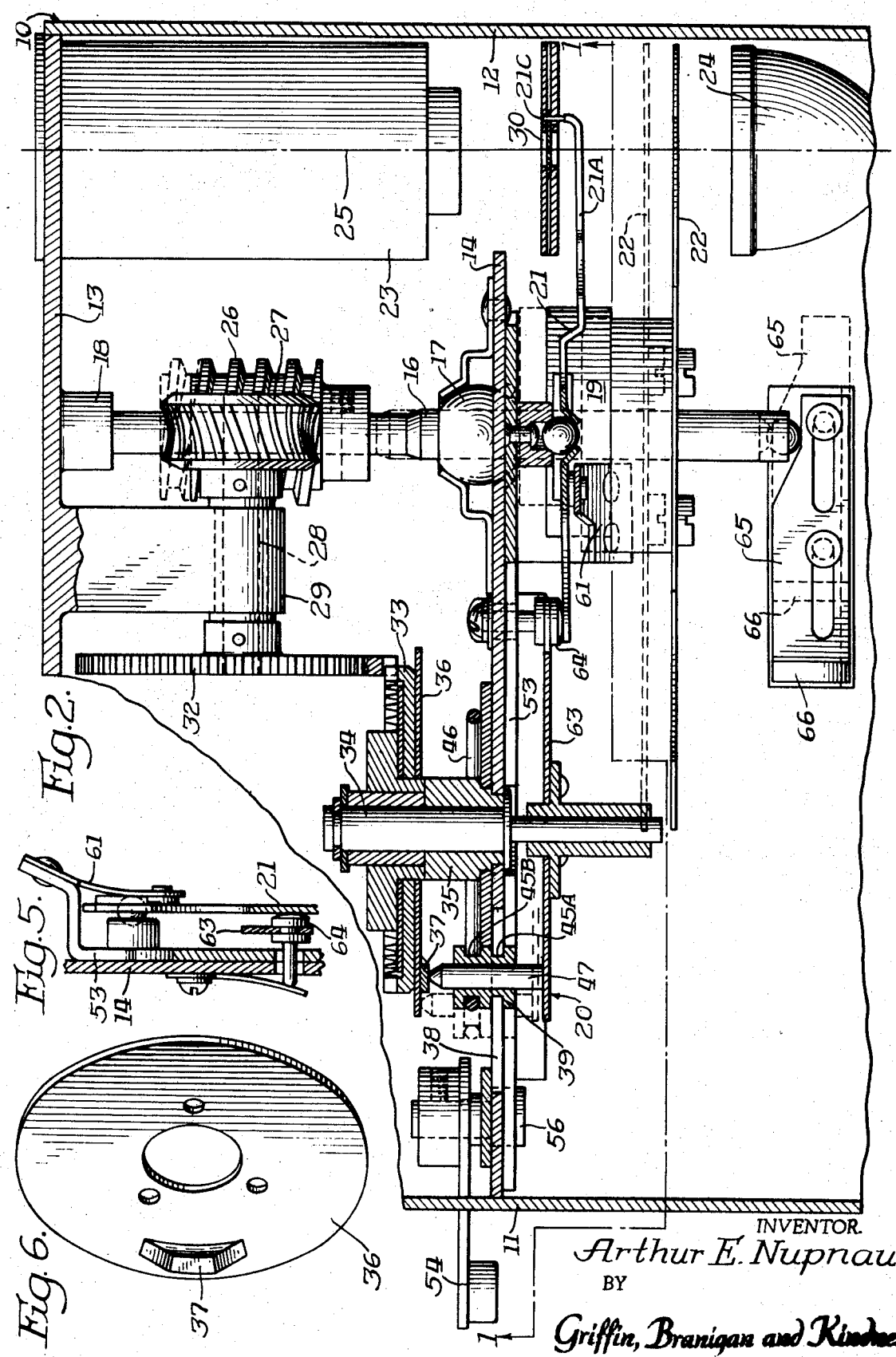

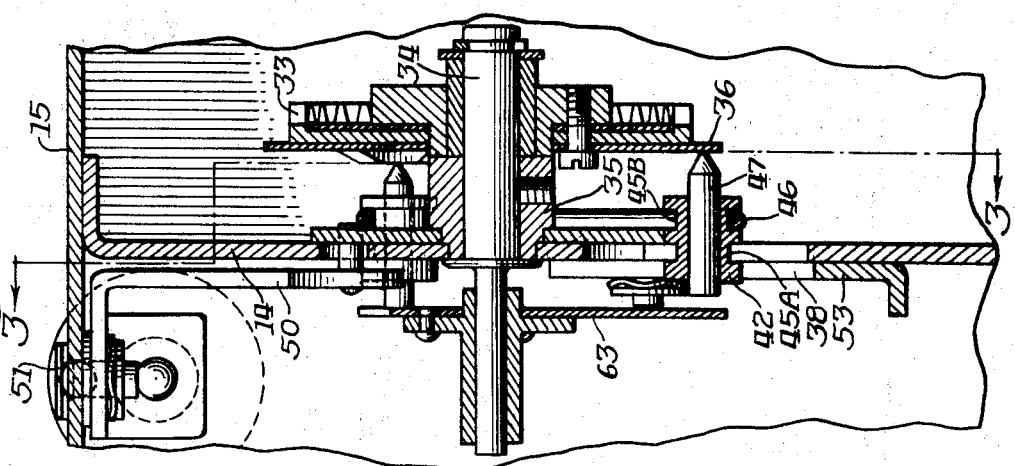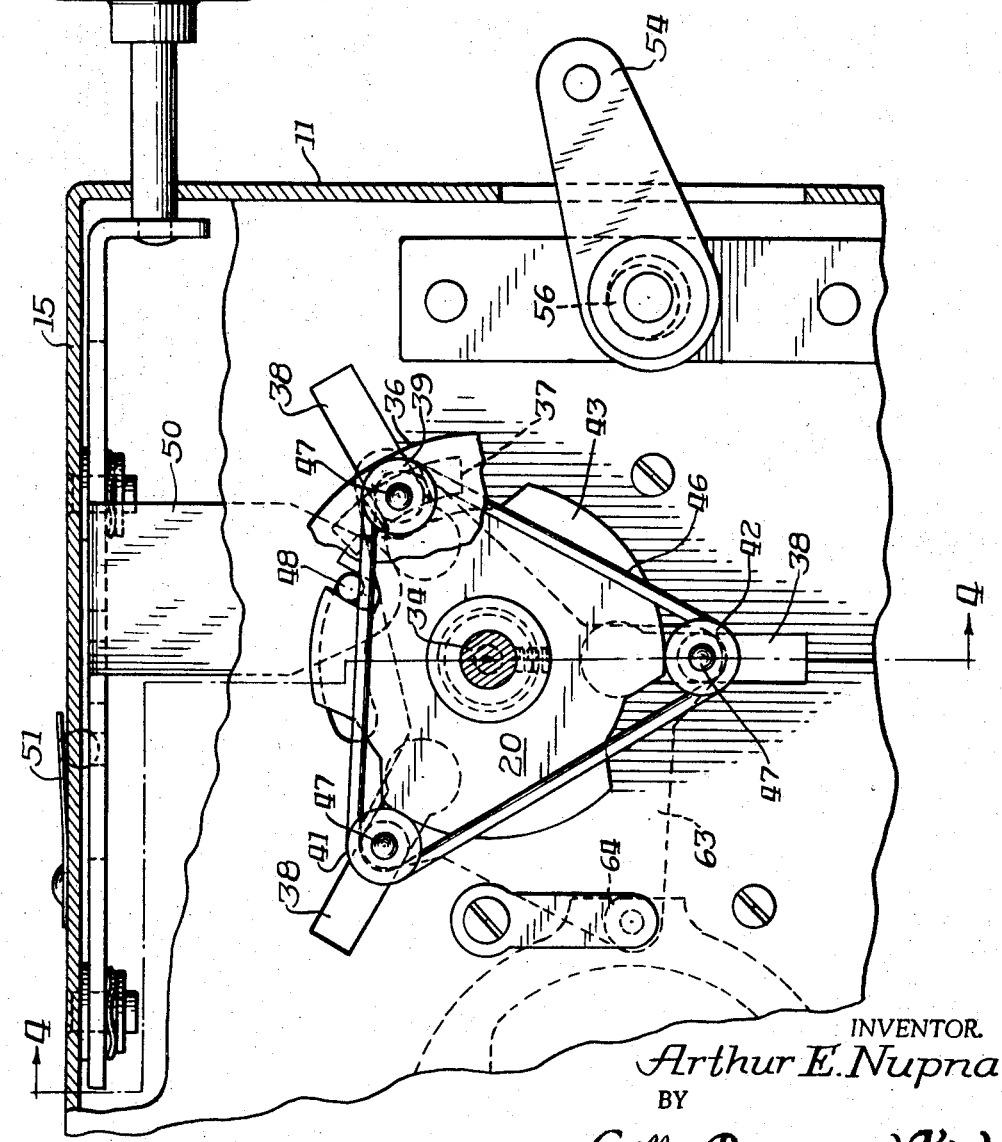

3,556,649
FILM MOVEMENT MECHANISM
Arthur E. Nupnau, Chicago, Ill., assignor to Bell & Howell Company, Chicago, Ill., a corporation of Illinois
Filed Apr. 22, 1969, Ser. No. 818,312
Int. Cl. G03b 1/22
U.S. Cl. 352—194
11 Claims

ABSTRACT OF THE DISCLOSURE

A variable speed movement mechanism is provided wherein a shuttle, adapted to move the film through the projection axis, is moved into and out of engagement with the film perforations at speeds that are related to, but may be different from, the movement of the shutter. The mechanism includes a shaft having mounted thereon a shutter adapted to move through the projection axis. Also mounted on the shaft is a cam operatively connected to the shuttle and adapted to move the shuttle in synchronism with the movement of the shutter. Operatively connected to the shaft is a control means adapted to move the shuttle into and out of engagement with the film perforation so as to vary the rate of engaging movement. A reversing means is also provided for reversing the direction of film movement so that both forward and reverse operation is achieved.

---

This invention relates to a film movement mechanism and more particularly to a variable speed means for moving otion picture film through the projection axis of a film viewing apparatus.

Apparatus for moving a motion picture film through the projection axis of a film viewing device, such as a projector, are well known in the art. They normally comprise a means adapted to coact with the film to move the film. The coaction usually occurs near the projection axis of the projector. The means may comprise a shuttle having claws adapted to engage perforations in the film. As the shuttle moves in one direction, the claws move into engagement with perforations in the film and advance the film. On the return stroke, the claws are disengaged from the film perforations so that they do not move the film.

While devices of the foregoing nature have found widespread use, their operation under varying film speed requirements have not always been entirely satisfactory. In many situations it is desirable to vary the rate of film movement. Slow film movement is particularly desirable so that a scene of interest can be viewed in greater detail. However, because many prior art devices have their film movement means coupled to their shutter means, they have been subject to an undesirable shutter flicker when running at slow film speeds. Specifically, projectors include a shutter to prevent a projection light from projecting an image during the time the film is moved. At normal operating speeds, the shutter operates fast enough so that no flicker is visible to the human eye. However, when the shutter movement slows down, a flicker is seen. This objectionable flicker occurs in prior art devices because of the coupling between the shutter movement and the film movement. One prior art patent (U.S. Pat. No. 3,212,849 to Roman et al.) illustrates one apparatus for solving this problem; this invention is a different apparatus for solving the problem.

Therefore, it is an object of this invention to provide a new and improved film movement mechanism.

It is also an object of this invention to provide a new and improved means for moving film at variable speeds wherein no undesirable flicker occurs when the film has slowed down.

It is a further object of this invention to provide a new and improved projector film moving mechanism wherein the film may be stopped or may be moved at speeds that vary while the movement of the projector shutter is kept constant.

Moreover, it is desirable to be able to reverse the direction of film movement. In some cases, this is desirable so that a particular portion of a film can be searched for. It may even be desirable to search for a particular frame of a film.

Hence, it is a further object of this invention to provide a new and improved film movement mechanism which can be slowed down, stopped, or reversed, from a normal film movement speed and direction without an undesirable flicker occurring.

In addition to a projector film moving mechanism having the ability to vary the rate of film movement, it is also desirable to have a projector film moving mechanism that is suitable for use with different types of film. Specifically, there has recently been developed a new 8 mm. motion picture film better known as Super 8 film. Hence, it is desirable to provide a film moving mechanism that can move both Super 8 and standard 8 mm. film through the projection axis of a projector.

Therefore, it is a further object of this invention to provide a new and improved film movement mechanism which is compatable with films of various sizes.

It is a still further object of this invention to provide a new and improved film moving mechanism that can move both Super 8 and standard 8 mm. motion picture film through the projection axis of a projector at varying forward and reverse speeds without a licker.

In accordance with a principle of the invention, a film movement mechanism is provided wherein a shuttle, adapted to move the film through the projection axis, is moved into and out of engagement with the film perforations at speeds that are related to, but may be different from, the movement of the shutter. The mechanism includes a shaft having mounted thereon a shutter adapted to move through the projection axis. Also mounted on the shaft is a cam operatively connected to the shuttle. The cam is adapted to move the shuttle in synchronism with the movement of the shutter. Operatively connected to the shaft is a control means. The control means is adapted to move the shuttle into and out of engagement with the film perforation. The control means is controllable to vary the rate of engaging movement. Hence, even though the shuttle is adapted to move in synchronism with the shutter movement, it only moves the film when the control means moves it into engagement with the film. The rate of engaging movement of the control means may be set to any desired value including zero.

In accordance with a further principle of the invention, a means is provided for reversing the direction of film movement. The reversing means includes a mechanism for changing the point of engagement of the shuttle with respect to the movement of the shuttle as determined by the cam mounted on the shaft. That is, a means is provided for causing the shuttle to engage the perforations at a point that is 180 degrees out of phase with its forward movement engagement position. In this manner, a reversal of film movement direction is provided.

In accordance with a still further principle of the invention, the film engaging claws of the shuttle are displaced a suitable distance so that they engage perforations of varying types of film, Super 8 and standard 8 mm. film, for example. A further means is provided to change the location of the shuttle so that the claws may engage films of varying size. Hence, the invention is compatible with varying size films.

It will be appreciated by those skilled in the art and others that the invention provides a simple mechanical means for varying the rate of movement of a film through a projector while maintaining the movement of the projector shutter at a constant speed. Further, the invention provides a simple means for reversing the direction of film movement to provide both forward and backward film travel directions. Moreover, the invention provides an equally simple means to make the film movement mechanism compatible.

The foregoing objects and many of the attendant advantages of this invention will become more readily appreciated as the same becomes better understood by reference to the following detailed description when taken in conjunction with the accompanying drawings wherein:

FIG. 1 is a vertical, sectional view taken along the line 1—1 of FIG. 2;

FIG. 2 is a horizontal cross-section taken along the line 2—2 of FIG. 1;

FIG. 3 is a vertical, sectional view taken along the line 3—3 of FIG. 4;

FIG. 4 is a vertical, sectional view taken along the line 4—4 of FIG. 3;

FIG. 5 is a vertical, sectional view taken along the line 5—5 of FIG. 1; and,

FIG. 6 is a perspective view of the in-and-out cam.

As illustrated in FIGS. 1 and 2, the projector comprises a housing generally indicated at 10, having sidewalls 11 and 12, a front wall 13, and a top wall 15. Parallel to the front wall 13 is an intermediate vertical wall 14 which serves as a mounting plate for most of the film movement mechanism of the invention. The projection lens 23 and projection lamp 24 are illustrated on the right of FIG. 2 and form a projection axis 25. An aperture 30 past which the film passes is formed along the projection axis between the lens 23 and the lamp 24.

The film movemnet mechanism of the invention generally comprises a main shaft 16, a reciprocating shuttle 21, a control structure generally indicated at 20, and a dual-bladed shutter 22. The main shaft 16 serves as the up-and-down shaft and is journalled in a bearing 17 and in a boss 18. The bearing 17 is preferably affixed to the vertical wall 14 and the boss 18 is preferably formed as a part of the front wall 13. Affixed to the main shaft is a heart-shaped gravity cam 19. A generally rectangular aperture in the shuttle 21 is mounted over the cam 19 and coacts with the cam to give a vertical reciprocating movement to the shuttle as viewed in FIG. 1.

The shuttle 21 has two arms 21A and 21B, each of which carries a single perforation engaging tooth 21C and 21D, respectively, mounted above and below the aperture 30. Preferably, the distance between teeth 21C and 21D is such that it will span nine frames of Super 8 film or ten frames of standard 8 mm. film. Thus, the shuttle is compatible to both film sizes so that the projector can be operated with either size film. However, it will be appreciated that these distances are only descriptive of when the projector is to be used with 8 mm. film. When the film moving mechanism of the invention is to be utilized in a 16 mm. or other film size projector, the distance between the teeth will be compatible with that size of film.

Also affixed to the shaft 16 is the dual-bladed shutter 22. The blades of the shutter pass through the projection axis of the projector. At normal operating speeds, one blade of the shutter serves to cover the aperture of the projector while film movement takes place; the other blade of the shutter serves as a flicker blade with no film movement taking place while it covers the aperture. However, as hereinafter described, when film movement is slowed down, film movement does not always occur when the shutter blade covers the aperture and never occurs when the flicker blade covers the aperture.

Illustrated in FIG. 2 is a means for conveying power from the main shaft 16 to the control structure 20. This mechanical power-conveying means generally comprises a worm 26, a worm wheel 27, a first shaft 28, a spur gear 32, a face gear 33, and a second shaft 34. The worm 26 is preferably set-screwed to the main shaft 16 at a point adjacent the boss 18. The worm wheel 27 is attached to the end of the first shaft 28. The first shaft 28 is rotatable in a bearing member 29 extending from the front wall 13. At the other end of the first shaft 28, the spur gear 32 is affixed. The spur gear meshes with the face gear 33 which is affixed to the second shaft 34. The second shaft 34 is the in-and-out cam shaft of the film movement mechanism.

Affixed to the face gear 33 on the side away from its geared face is an in-and-out face cam 36 having (FIG. 6) a cam lobe 37, formed in its operating face. The in-and-out cam shaft 34 is fixedly mounted in a mounting member 35 which, through additional mounting structure, is affixed to the vertical wall 14.

Turning now to the control structure 20 of the invention, formed in the vertical wall 14 surrounding the shaft 34 are three radial keyhole-shaped slots 38. The keyhole-shaped slots 38 serve to slidably mount three bushings 39, 41, and 42. These bushings have a first annular groove 45A of reduced diameter to fit the straight portion of the keyhole-shaped slots 38. The bushings also have a second annular groove 45B to accommodate a stretched, round, rubber endless belt 46. The endless rubber belt 46 urges the bushings 39, 41, and 42 in the direction of the shaft 34. Each of the bushings has a pin 47 axially slidable therein. The pins 47 are adaptable to be contacted by the cam lobe 37 of the in-and-out cam 36 when the bushings are adjusted to the proper radial position.

The actual location of the bushings is determined by a circular cam 43. The circular cam is mounted for rotation on the second shaft 34. The cam consists of a flat member having a plurality of indentations located about its periphery. These indentations are adapted to be aligned with the slots 38 to allow the bushings to slide toward the second shaft 34. This sliding movement is created by the endless rubber belt 46. When the cam is revolved, its outer periphery operatively coacts with the bushings to move them outwardly. When an indentation lines up with one of the slots 38, the bushings in that slot move inwardly to a predetermined position. Specifically, when the bushings are at their inward position, the pins operatively coact with the cam lobe 37.

The location of the circular cam 43 is adjusted through a pin and slot connection 48 to a metal finger 50 extending downwardly from the top of the projector. A detent mechanism 51 is connected to the metal finger 50 and provides for these detented positions of the adjusting mechanism.

FIG. 1 illustrates a position of the circular cam 43 wherein all of the pins 47 are adjusted to be contacted by the cam lobe 37 of the in-and-out cam 36. This means, as hereinafter described, that there will be three in-and-out movements of the shuttle 21 per revolution of the face cam 36. Preferably, three in-and-out movements of the shuttle result in a projection film feed rate of 18 frames per second. This projection film feed rate operates to provide a conventional moving picture illustration on a screen. That is, it is a normal film feed rate.

FIG. 3 illustrates a position of the cam 43 wherein its outer periphery has moved bushings 41 and 42 with their pins 47 clear of the cam lobe 37. Hence, as the face cam 36 revolves, its lobe will only operatively coact with the pin extending through bushing 39. This means that only one in-and-out movement per revolution of the in-and-out cam 36 occurs. Under this condition, a projection film feed rate of 6 frames per second occurs. This is a slow-motion projection position. The third adjustment of the detent mechanism brings the cam 43 to a position wherein none of the pins coact with the cam lobe 37. Under this condition, no in-and-out movement of the shuttle occurs per revolution of the in-and-out cam 36. Hence, this is a still frame position. That is, the picture illustrated on the screen is not moving.

Since, when the invention is utilized in an 8 mm. projection, it is to be compatible with both Super 8 and standard 8 film, it is necessary that a horizontal displacement of the shuttle 21 take place to accommodate the diffent perforation shapes and locations used in these different films. To accomplish this, the shuttle structure is mounted on an auxiliary plate 53 which is mounted to and slidable with respect to the vertical wall 14. The means to provide this movement comprise a lever 54 attached to an eccentric 56 fitting in a slot 57 in the auxiliary plate 53. The eccentric and slot combination provides a manual adjustment for the horizontal movement of the shuttle so that it can accommodate either Super 8 or standard 8 types of perforations.

The shuttle 21 is arranged to reciprocate in a vertical direction and pivot in a horizontal direction on a pair of balls 59 and 60 which are socketed to the auxiliary plate 53. A pair of leaf springs 61 riveted at one end to the plate 53 bear at their opposite ends on the face of the shuttle 21. The leaf springs 61 press against the face of the shuttle 21 at a position that is on the left of the up-and-down cam shaft center as viewed in FIG. 1. In this manner, the shuttle 21 is spring-urged in contact with the balls 59 and 60 and is pivotally urged in a direction where the shuttle teeth are out of engagement with the film perforations.

A transfer member 63 is axially slidable on a reduced portion of the shaft 34. The transfer member has a contact button 64 that transfers the movement of the pins 47 to the shuttle 21 to pivot it into and out of film perforation engagement based on the in-and-out movement of the pins 47. That is, each time a pin engages one side of the transfer member 63, it moves the member axially along the shaft 34 in a direction toward the shuttle 21. This axial movement moves the contact button 64 into engagement with the shuttle. When the contact button is engaged with the shuttle 21, it pivots the shuttle to move its claws into contact with the film.

The button 64 has a reduced portion which extends through slots in both plates 14 and 53 to prevent rotational movement of the transfer member 63. As viewed in FIG. 5, the back end of this reduced portion has a leaf spring of relatively light tension brought to bear against it. This leaf spring keeps the button in constant contact with the end of the shuttle 21.

It will be appreciated that the foregoing has described a simple system for creating varying rate of film feed. That is, a simple cam and pin mechanism in conjunction with a transfer member, creates an in-and-out movement of the shuttle. The rate of in-and-out movement of the shuttle determines the rate of film feed. It will be appreciated that the shuttle and the shutter are moving at constant speeds in the vertical direction through the projection axis of the projector. However, because the in-and-out movement of the shuttle can be made to vary, the rate of actual film movement can also be made to vary.

In addition to a means for moving the film in a forward direction, the invention also includes a means to reverse the film movement direction. To achieve a reversal of the film movement direction, it is necessary to effect a 180 degree phase shift of the up-and-down cam 19 with respect to the in-and-out cam 36. This is illustrated in FIG. 1 where the up-and-down cam is shifted 180 degrees to the position illustrated by the dotted lines.

The shifting takes place by an axial longitudinal movement of the shaft 16 and the worm 26 affixed thereto. By shifting the worm, an appropriate distance with respect to the means connecting it to the in-and-out cam, a 180 degree phase shift between the movement of the in-and-out cam and the movement of the up-and-down action of the shuttle is created. This 180 degree phase shift causes a cyclic inversion of the points of engagement and disengagement between the shuttle's claws and the film's perforations. In addition, the shutter blades shift functions. That is, the flicker blade during forward operation becomes the shutter blade during reverse operation and vice versa.

Axial shifting of the shaft 16 to reverse the film feed direction is accomplished by a manualy operated cam slide 65 illustrated in FIG. 2. The cam slide 65 has an upstanding arm 66 which extends through the top of the projector housing. When the cam slide is moved to the right, as illustrated in FIG. 2, it causes an axial shifting of the main shaft 16 so that the desired 180 degree shift is created. This axial shift can occur when the film is moving so that a sharp change from forward to reverse can occur to allow for easier searching when a desired part of a film is being sought.

Although not shown, any suitable means may be used to apply power to the main shaft 16. For example, the shaft of a constant speed motor could be connected, through appropriate gearing, to the worm wheel 27. Or, the shaft of a constant speed motor could be connected through gears to a power gear mounted on the main shift 16.

It will be appreciated that the foregoing description has described a simple apparatus for varying the film movement of a projector or other film viewing apparatus without varying the speed of movement of the projector shutter. The apparatus includes a main shaft means for moving a shutter and a shuttle in synchronism. Connected to the main shaft is a control structure adapted to move the shuttle into and out of engagement with perforations in the film. The in-and-out movement of the shuttle per revolution of the main shaft determines the rate of film movement during a complete cycle of operation. Hence, the rate of movement of the film is independent of the rate of movement of the shutter. Because of this independence, the shutter can be rotated at a speed sufficiently fast to prevent flicker when the film is being viewed on a screen, for example. Moreover, the rate of movement of the film can be decreased to a slow motion or stop position without flicker problems. In addition, when the invention is utilized with variable size films, such as Super 8 or standard 8 a sysem is provided for moving variable size films through the projector. Finally, the direction of film travel can be reversed.

While the foregoing description has described one simple embodiment of the invention, it will be appreciated by those skilled in the art that various structural changes are within the scope of the invention. Hence, it is to be understood that the invention may be practiced otherwise than as specifically described herein.

The embodiments of the invention in which an exclusive property or privilege is claimed are defined as follows:

1. Apparatus for moving variable sized motion picture film past an aperture in a film viewing device comprising:
   a main shaft mounted in said film viewing device and adapted to be revolved at a predetermined speed;
   a shuttle having a plurality of claws adapted to move into and out of engagement with perforations in said film for moving said film past said aperture;
   first cam means mounted on said main shaft and adapted to operatively coact with said shuttle to reciprocate said shuttle in the direction of film movement at the rate of revolution of said shaft, the distance of movement of the claws of said shuttle being equal to the distance necessary to move one frame of said film past said aperture;
   control means operatively connected to said main shaft for causing an engaging and a disengaging movement of said shuttle, said control means includes a second cam means operative to move at a speed slower than said main shaft, having a contacting member for contacting a plurality of cam follower means and including a plurality of cam follower means adapted to operatively coact with said shuttle means when said cam follower means are contacted by said contacting member of said second cam means for moving said shuttle means into and out of engagement with the perforations in said film; and means coupled to said control means and to said shuttle means for varying the location of the shuttle's claws so that the location of said claws is compatible with varying types of film.

2. Apparatus as claimed in claim 1 including a further means for reversing the direction of film movement by shifting the reciprocation of said shuttle 180 degrees with respect to the engaging and disengaging movement of said shuttle.

3. Apparatus as claimed in claim 2 wherein said second cam means includes a face cam and said contacting means comprises a lobe on said face cam and wherein said plurality of cam follower means comprise a plate member having mounted thereon a plurality of spring controlled members adapted to press against one face of said face cam, said spring controlled members also adapted to move against said lobe to cause said in and out engaging movement of said shuttle.

4. Apparatus as claimed in claim 3 wherein said second cam means also includes:
a face gear and a second shaft;
said face gear being mounted on said second shaft;
said face cam being mounted on the flat side of said face gear; and
said face gear being operatively connected to and driven by said main shaft.

5. Apparatus as claimed in claim 4 wherein said plate member has a plurality of slots radially projecting from a central point which coincides with the central axis of said second shaft;
said spring control members include bushings, equal in number to the number of slots, having a pair of annular grooves, one of said annular grooves fitted into said slot and adapted to slide along a length of said slot and the second of said annular grooves adapted to receive an endless rubber belt; and
an endless rubber belt mounted in said second annular groove, said endless rubber belt forcing said bushings toward said central point.

6. Apparatus as claimed in claim 5 including means to move said bushings to a predetermined position.

7. Apparatus as claimed in claim 6 wherein said means to move said bushings to a predetermined position comprises a third cam mounted on said second shaft; and
said third cam having indentations on its outer periphery adapted to coact with said bushings to move them to internal or external positions.

8. Apparatus as claimed in claim 7 including a detent mechanism operatively coupled to said third cam for revolving said third cam.

9. Apparatus as claimed in claim 8 wherein a pin is mounted through the hole in each bushing and operatively coacts with the lobe of said face cam and said shuttle means to move said shuttle means into engagement with the film's perforations when the lobe of said cam operatively coacts with a pin.

10. Apparatus as claimed in claim 7 wherein said pins operatively coact with said lobe of said face cam when said third cam allows said bushings to move into their internal position.

11. Apparatus as claimed in claim 10 including a shutter operatively connected to said main shaft to revolve at the speed of said main shaft.

References Cited

UNITED STATES PATENTS

| | | | |
|---|---|---|---|
| 2,484,348 | 10/1949 | Kellogg et al. | 226—65 |
| 2,521,957 | 9/1950 | Wittel et al. | 226—65 |
| 2,612,075 | 9/1952 | Kellogg et al. | 226—65X |
| 2,704,488 | 3/1955 | Mitchell | 226—65 |
| 3,152,741 | 10/1964 | Jorgensen | 226—65 |

ALLEN N. KNOWLES, Primary Examiner

U.S. Cl. X.R.

226—66